US012263486B2

(12) United States Patent
Rodriquez et al.

(10) Patent No.: US 12,263,486 B2
(45) Date of Patent: Apr. 1, 2025

(54) AGGREGATE WASHING SYSTEMS, METHODS, AND APPARATUS

(71) Applicant: Superior Industries, Inc., Morris,, MN (US)

(72) Inventors: John Rodriquez, Nokomis, FL (US); Shane Hanson, Columbus, NE (US); John Bennington, Indianola, IN (US)

(73) Assignee: Superior Industries, Inc., Morris, MN (US)

( * ) Notice: Subject to any disclaimer, the term of this patent is extended or adjusted under 35 U.S.C. 154(b) by 8 days.

(21) Appl. No.: 18/511,493

(22) Filed: Nov. 16, 2023

(65) Prior Publication Data

US 2024/0082852 A1 Mar. 14, 2024

Related U.S. Application Data

(63) Continuation of application No. 17/646,840, filed on Jan. 3, 2022, now Pat. No. 11,850,603.

(60) Provisional application No. 63/133,767, filed on Jan. 4, 2021.

(51) Int. Cl.

| | |
|---|---|
| ***B03B 5/04*** | (2006.01) |
| ***B03B 5/34*** | (2006.01) |
| ***B03B 9/00*** | (2006.01) |
| ***B08B 3/02*** | (2006.01) |
| ***B08B 3/04*** | (2006.01) |

(52) U.S. Cl.

CPC .................. *B03B 5/04* (2013.01); *B03B 5/34* (2013.01); *B03B 9/00* (2013.01); *B08B 3/02* (2013.01); *B08B 3/042* (2013.01)

(58) Field of Classification Search

None

See application file for complete search history.

(56) References Cited

U.S. PATENT DOCUMENTS 2,914,175 A * 11/1959 Fink .......................... B07B 1/00 209/269

2009/0057204 A1 * 3/2009 Bennington, II ....... B30B 9/128 209/156

* cited by examiner

*Primary Examiner* — Eric W Golightly

(74) *Attorney, Agent, or Firm* — Todd R. Fronek; Larkin Hoffman Daly & Lindgren, Ltd.

(57) ABSTRACT

A method of washing aggregate material, the method comprising: receiving aggregate material in a tank; receiving water in said tank; by at least a rear wall of said tank, retaining said aggregate material and water in a rearward portion of said tank and preventing said water and aggregate material from overflowing said rear wall; agitating said aggregate material and water to form a slurry; advancing said slurry to a tank outlet in a forward portion of said tank; depositing said slurry through said tank outlet; receiving said slurry on a vibrating screen; allowing an undersize portion of said slurry to fall through said vibrating screen; pumping at least a fraction of said undersize portion to a hydrocyclone; by said hydrocyclone, separating said fraction of said undersize portion into an underflow fraction and an overflow fraction; receiving said underflow fraction on said vibrating screen; and passing product from said vibrating screen.

13 Claims, 15 Drawing Sheets

AGGREGATE WASHING SYSTEMS, METHODS, AND APPARATUS

CROSS-REFERENCE TO RELATED APPLICATIONS

This application is a Continuation of U.S. application Ser. No. 17/646,840, filed Jan. 3, 2020, and issued as U.S. Pat. No. 11,850,603, which claims priority from U.S. Provisional Application No. 63/133,767, filed Jan. 4, 2021.

BACKGROUND

Aggregate washing equipment is used to wash, dewater, and/or otherwise process aggregate material.

DESCRIPTION

Figure 1:
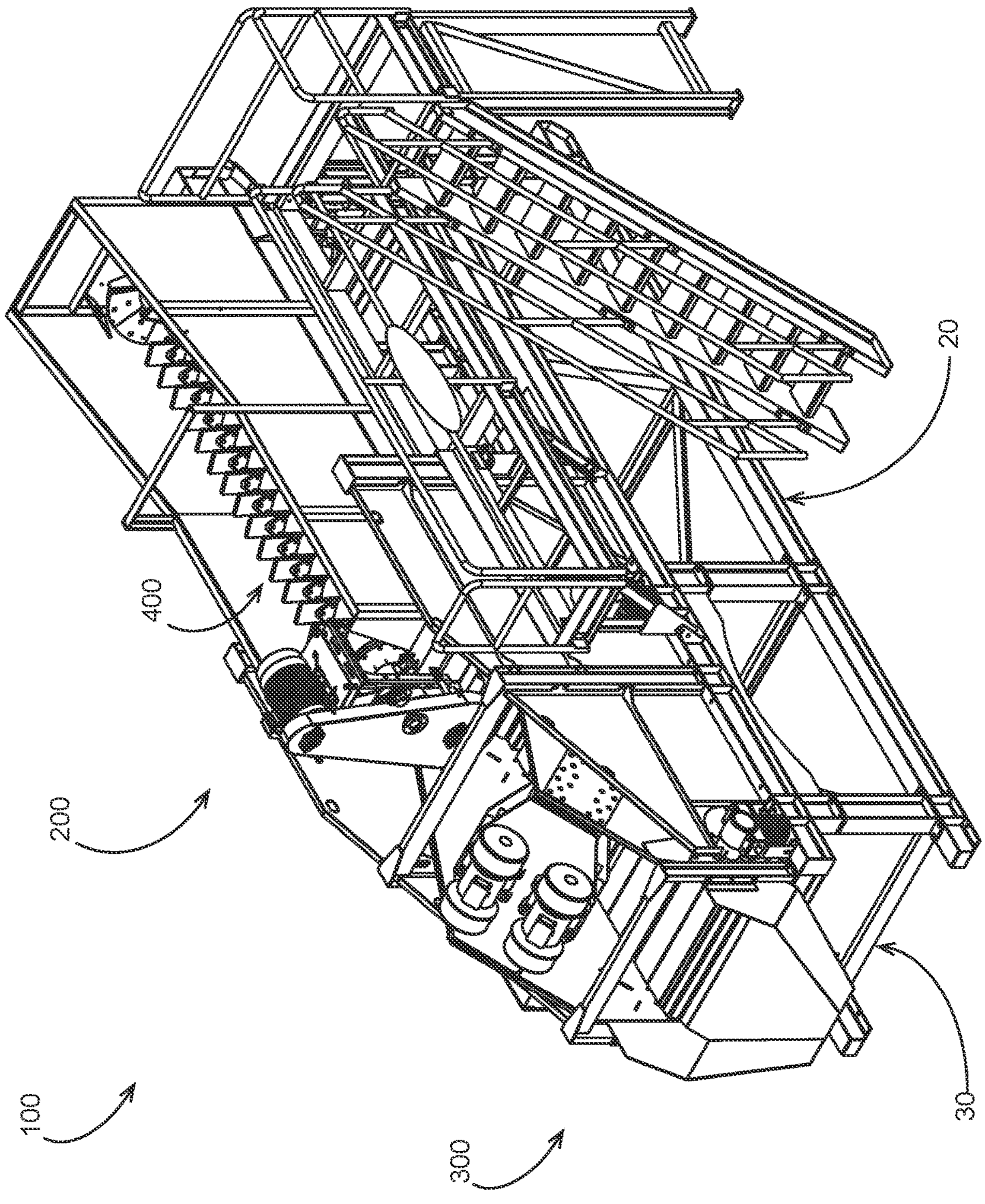
FIG. 1 is a perspective view of an embodiment of an aggregate washing system.
Figure 2:
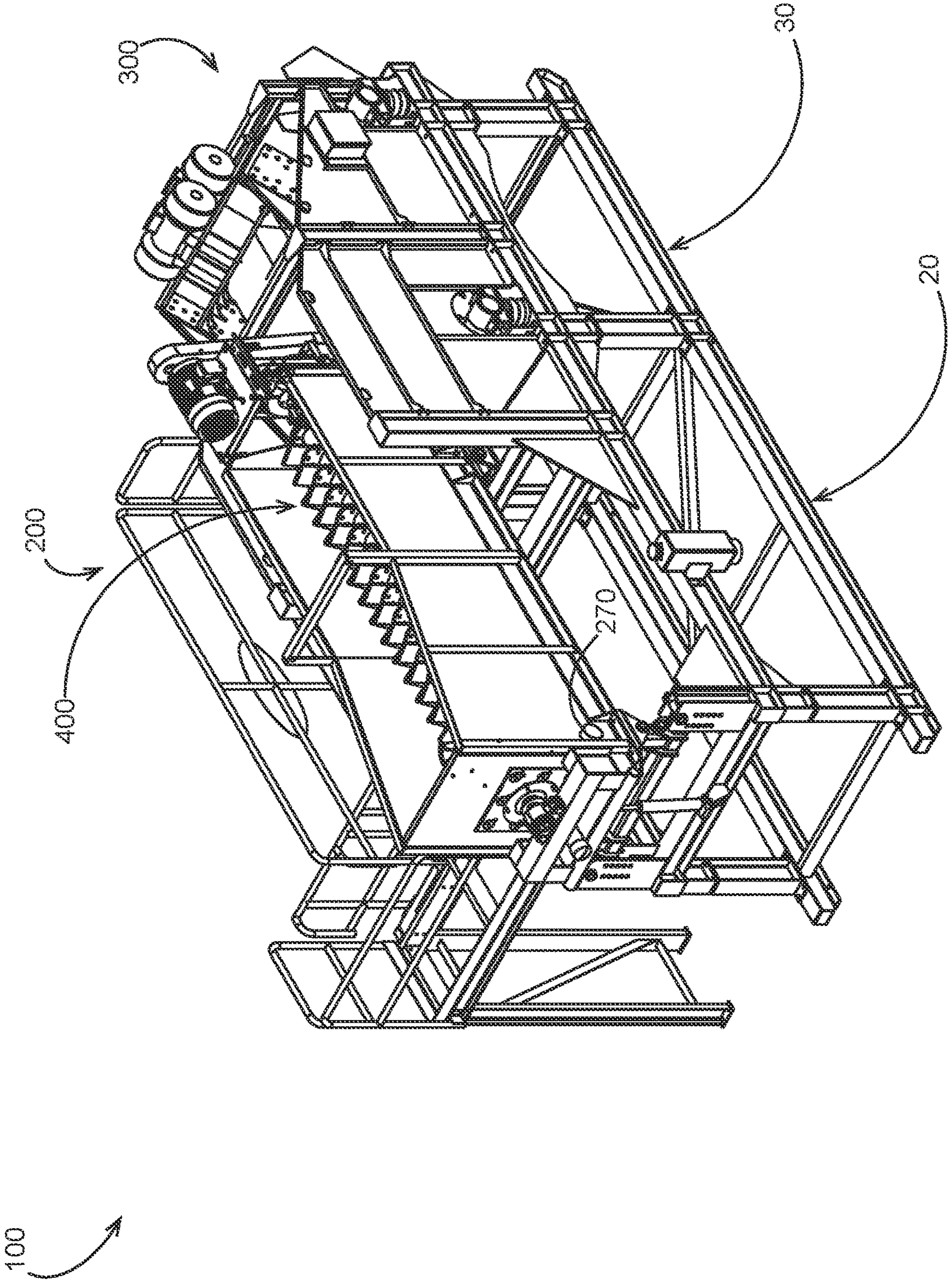
FIG. 2 is another perspective view of the aggregate washing system of FIG. 1.

Referring to the drawings, wherein like reference numerals designate identical or corresponding parts throughout the several views, FIG. 1 illustrates an embodiment of an aggregate washing system 100 that optionally includes a slurrying mechanism 200 (which may be described as a slurry-forming mechanism, an agitator, agitating mechanism, mixer, mixing mechanism, stirring mechanism, slurrifier, slurrifying mechanism, slurry mixer, slurry mixing mechanism, etc. according to some embodiments) and that optionally includes a dewatering mechanism 300 (e.g., a classifying mechanism such as a vibrating screen), which may be arranged in series as illustrated such that material (e.g., slurry) processed by the slurrying mechanism 200 is transferred to the dewatering mechanism 300. The slurrying mechanism 200 and dewatering mechanism 300 are optionally supported by frames 20, 30, respectively which are described elsewhere herein. The frames 20, 30 may comprise sections of a single rigidly and/or releasably interconnected frame or may be two independent and/or relatively movable frames. The frames 20, 30 may be mounted (e.g., by welding) to other structure or may be movably supported by skids, wheels or other mobile structure. Thus, the aggregate washing system 100 may be deployed as a single mobile plant, as a plurality of separate mobile plants, or in a stationary plant setting.

The slurrying mechanism 200 optionally generates a slurry comprising water and aggregate materials. The slurrying mechanism 200 optionally passes the slurry (e.g., all or substantially all of the slurry exiting the slurrying mechanism) to the dewatering mechanism. The dewatering mechanism optionally removes water (and/or fines or other undersize material) from the slurry and optionally passes at least partially washed (e.g., substantially washed, saleable, etc.) product (e.g., sand).

Water or other fluid (e.g., from a pond, tank or other water source) is optionally provided (in some embodiments exclusively provided) to the interior of the slurrying mechanism 200 via an inlet 270. The inlet 270 is optionally formed in and/or extends through a sidewall (e.g., optionally at a lower end thereof and optionally at a rearward end thereof) and optionally in fluid communication with a water source, e.g. by fitting to a hose or pipe (not shown).

The slurrying mechanism 200 optionally includes a propulsion assembly 400 driven by an electric motor or other motor. The propulsion assembly may have one or more functions which may include agitating the aggregate material and water to form a slurry (e.g., agitating, mixing, slurrifying, slurrying, etc.) and/or propelling the raw material, water and/or aggregate material generally forwardly to an opening through which material is deposited onto the dewatering mechanism 300.

Figure 3:
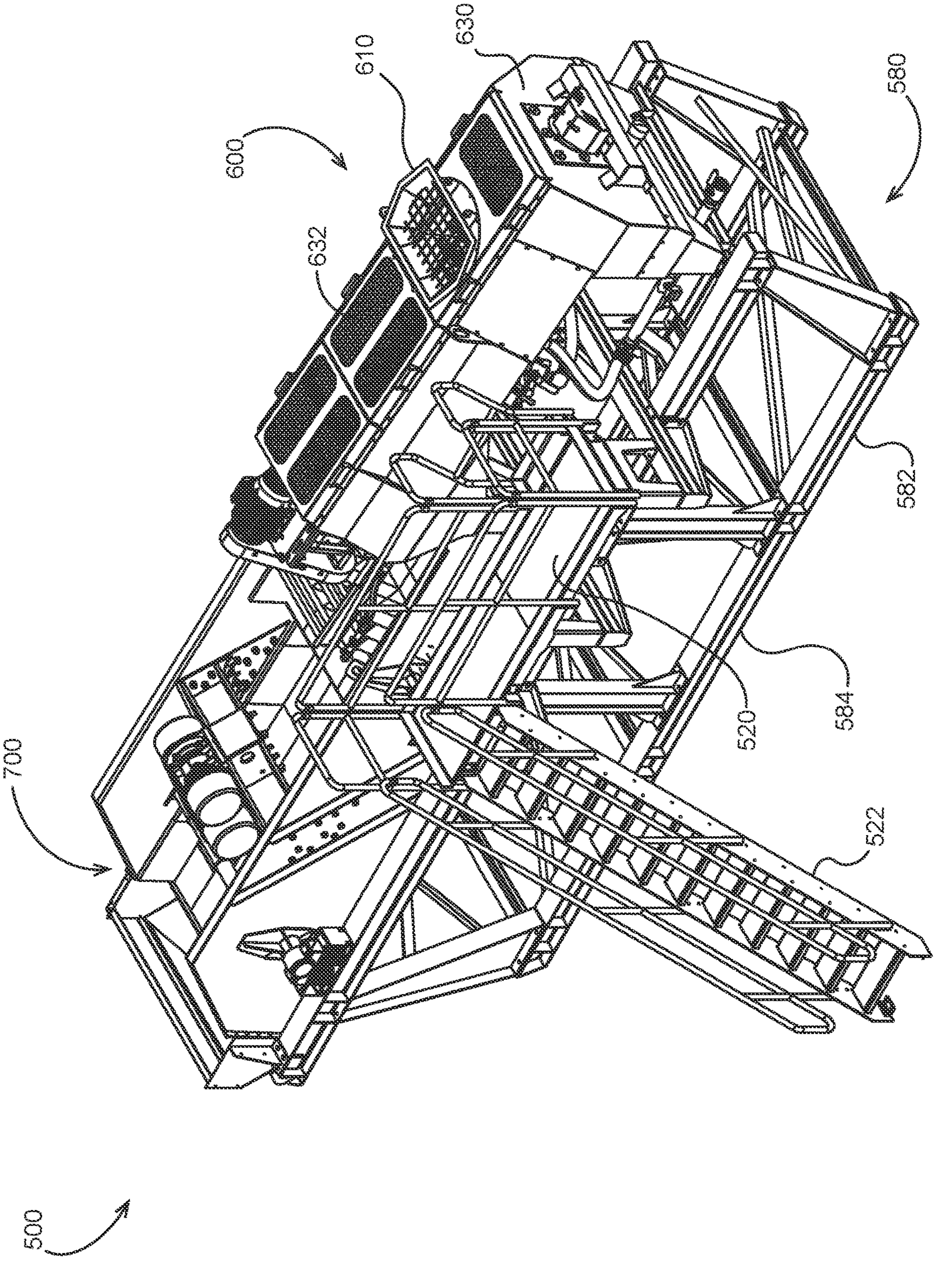
FIG. 3 is a perspective view of another embodiment of an aggregate washing system.
Figure 4:
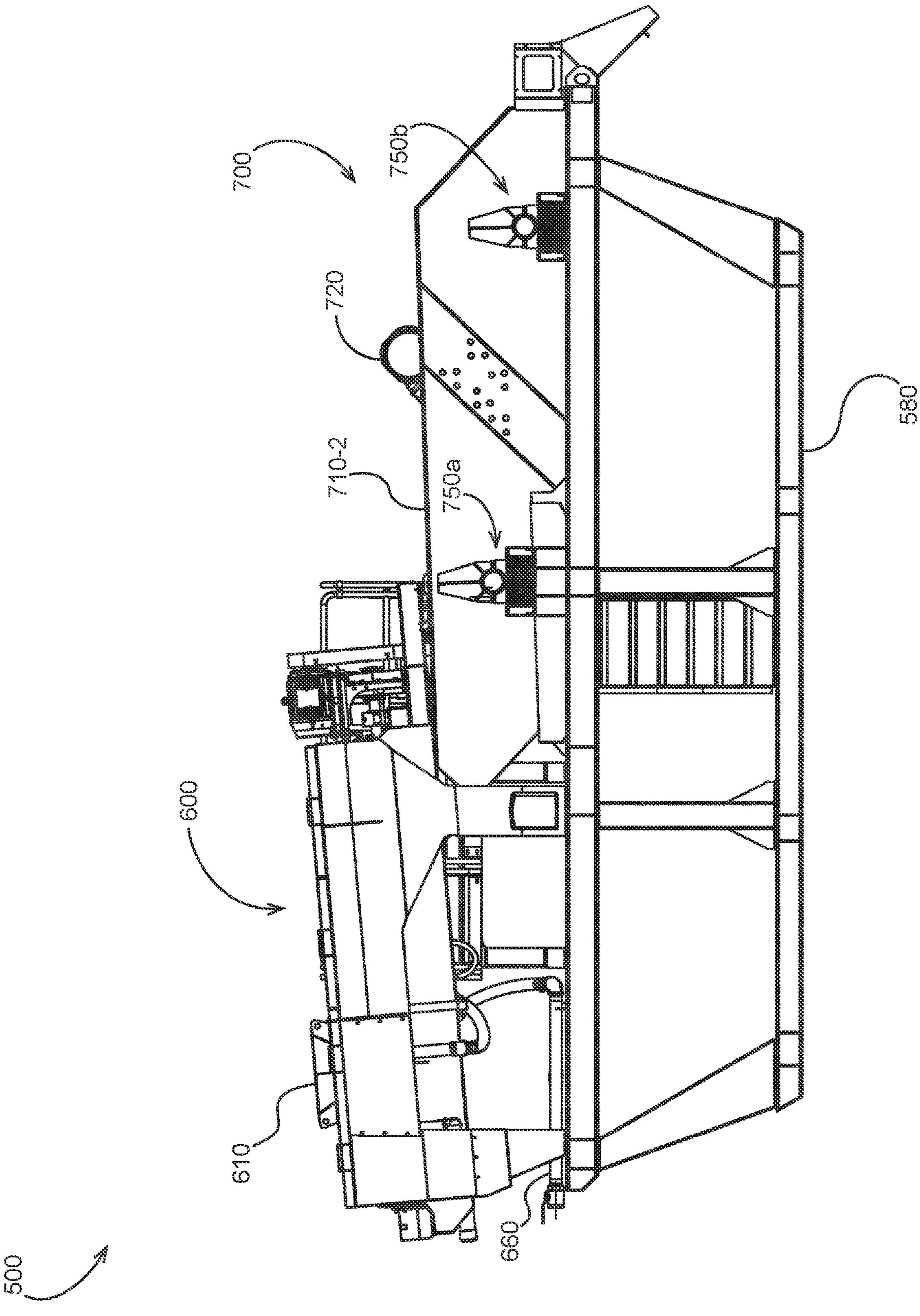
FIG. 4 is a side elevation view of the aggregate washing system of FIG. 3.
Figure 5:
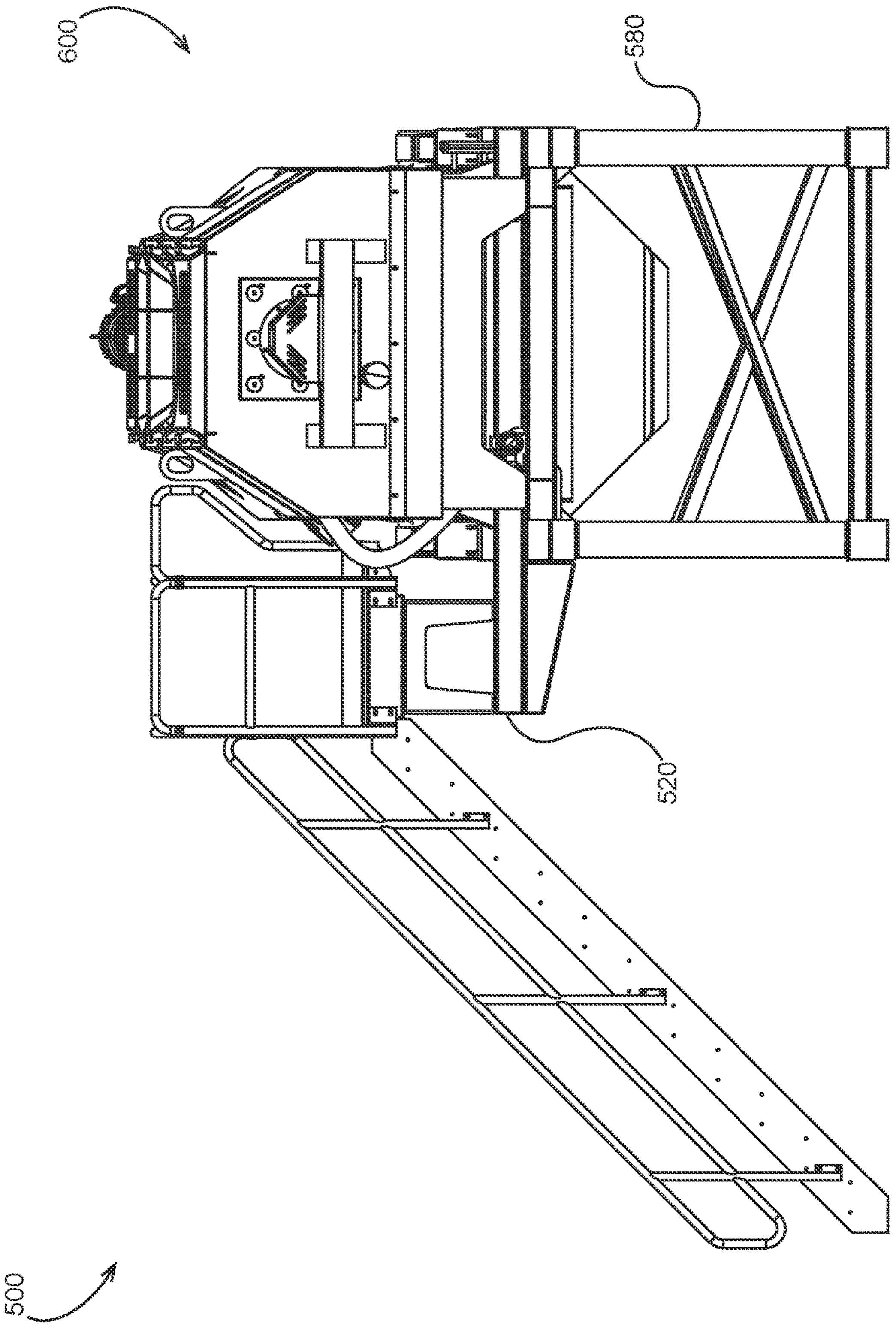
FIG. 5 is a rear elevation view of the aggregate washing system of FIG. 3.

Referring to FIGS. 3-5, another embodiment of an aggregate washing system 500 is illustrated including a slurrying mechanism 600 and a dewatering mechanism 700 (e.g., dewatering screen). The aggregate washing system 500 is optionally supported on a frame 580 (e.g., mobile or stationary frame) which optionally comprises a first frame 582 (e.g., optionally at least partially disposed beneath slurrying mechanism 600) and a second frame 584 (e.g., optionally at least partially disposed beneath dewatering mechanism 700). In some embodiments the frame 580 comprises a single unitary frame; in other embodiments the frame 580 comprises separate and/or separable frame portions for separately supporting the slurrying mechanism and dewatering mechanism. In some embodiments the frame 580 (and/or individual frames or frame portions) supports one or more platforms 520 for accessing the slurrying mechanism 600 and/or the dewatering mechanism 700. Each platform 520 optionally includes a ladder 522 for accessing the platform 520.

The slurrying mechanism 600 optionally comprises a tank 630 for containing aggregate material and water. One or more screens 632 (e.g., grates, mesh screens, etc.) are optionally positioned above at least a portion of the tank 630. An inlet 610 (which may also comprise one or more screens) is optionally disposed above the tank 630 for introducing a feed (e.g., aggregate material, etc.) into the tank 630.

Figure 6:
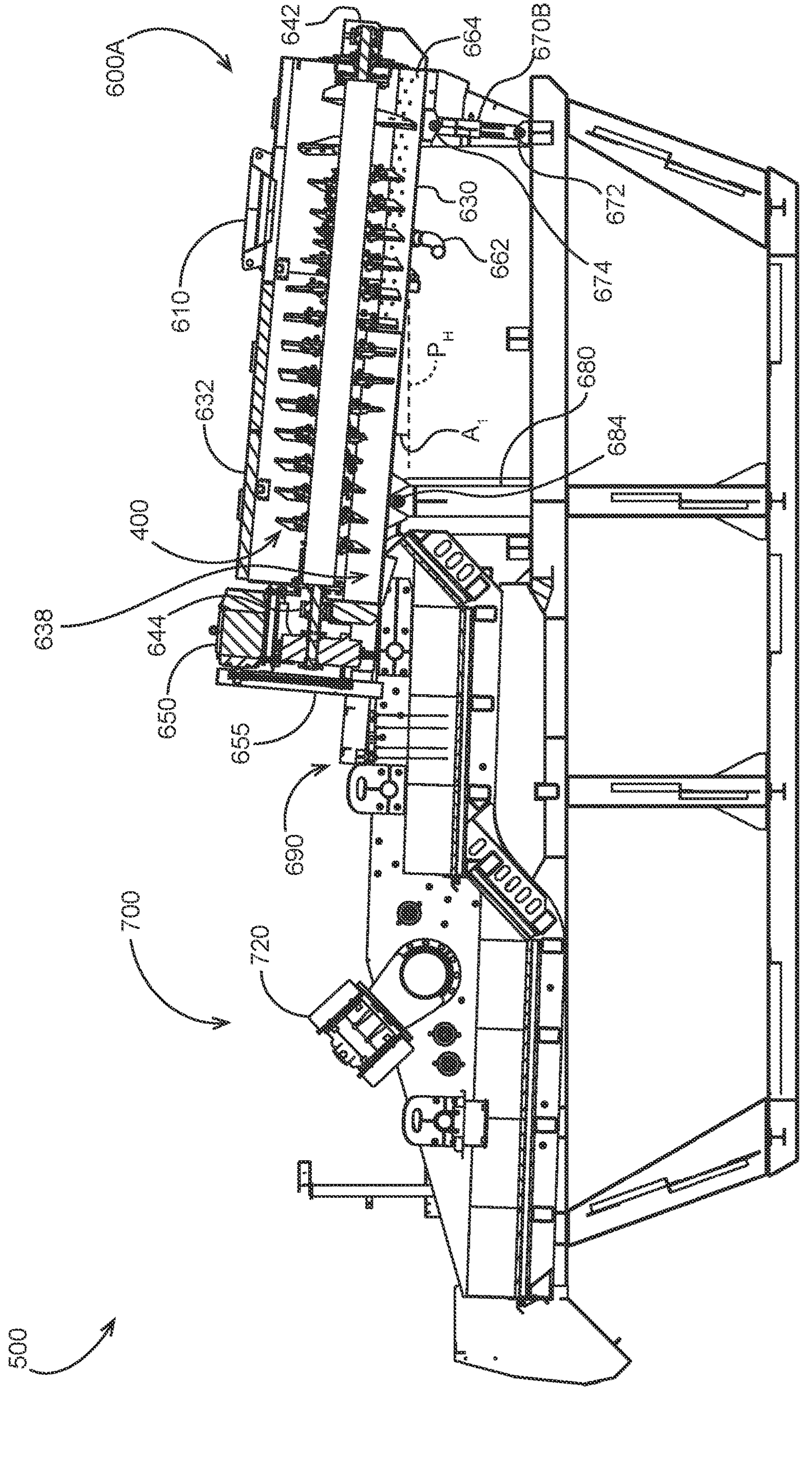
FIG. 6 is a sectional cutaway view along the section 5-5 of FIG. 5 in a first configuration.

Referring to FIG. 6, the slurrying mechanism 600 optionally includes a propulsion assembly 400 driven by an electric motor or other motor. The propulsion assembly 400 may include one or more common features or functionality of the propulsion assembly of the slurrying mechanism 200. The propulsion assembly 400 may have one or more functions which may include agitating the aggregate material and water to form a slurry (e.g., agitating, mixing, slurrifying, slurrying, etc.) and/or propelling the raw material, water and/or aggregate material generally forwardly and/or upwardly to an opening 638 through which material (e.g., agitated material, mixed material, slurrified material, slurry, aggregate slurry, etc.) exits the tank. In the illustrated embodiment the material exiting opening 638 falls by gravity into the dewatering mechanism 700; in other embodiments, the material may instead by conveyed by one or more mechanisms (e.g., one or more conveyors, chutes, etc.) to the dewatering mechanism 700. The propulsion assembly 400 is optionally rotatably supported on bearings 642, 644. The propulsion assembly 400 is optionally driven for rotation by a motor 650 such as an electric motor (e.g., directly or via a belt 655 or other mechanism). In one embodiment, the propulsion assembly includes a shaft and a plurality of paddles are mounted to the shaft. The plurality of paddles can be arranged in a generally spiral arrangement.

Figure 7:
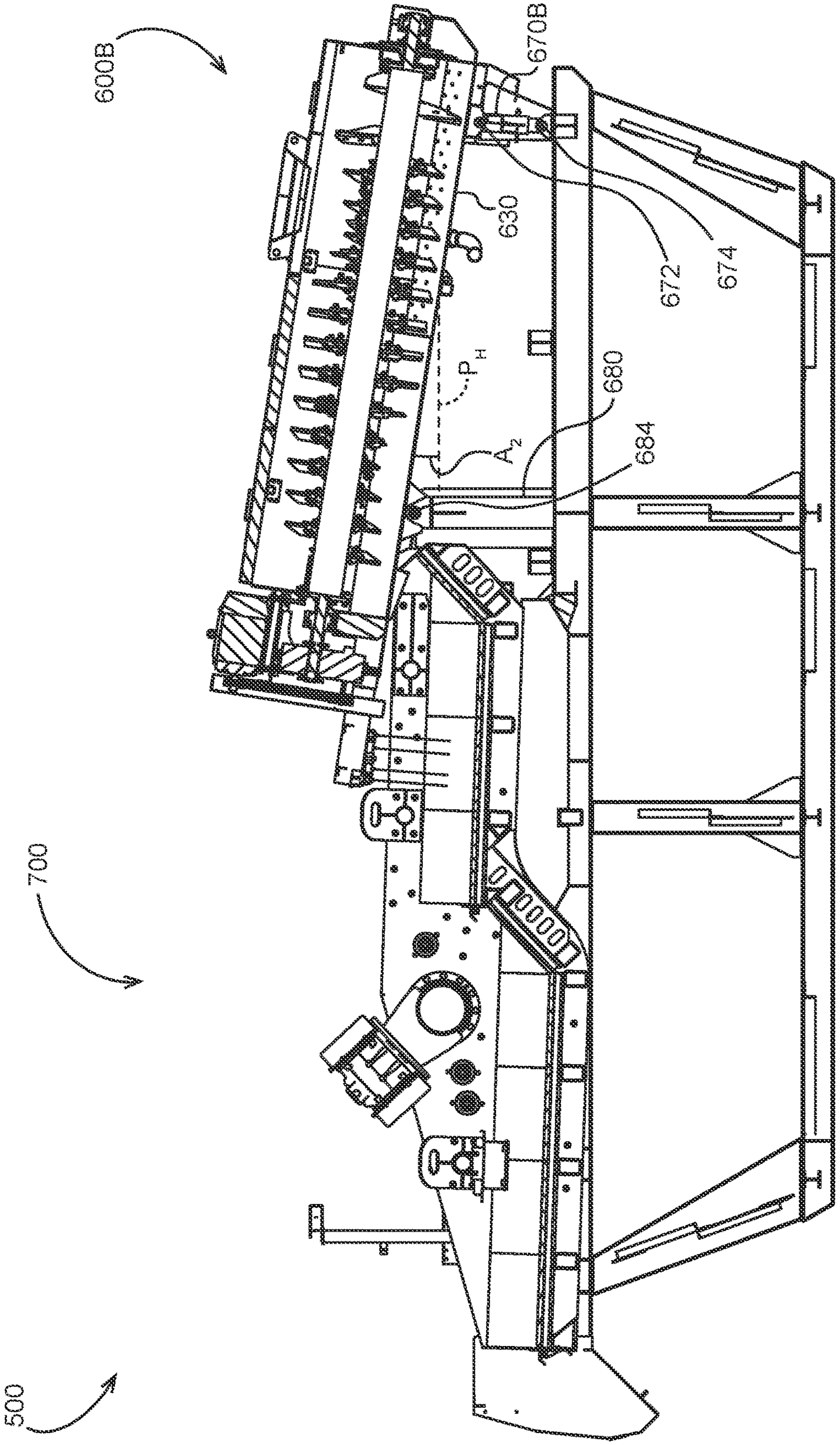
FIG. 7 is a sectional cutaway view along the section 5-5 of FIG. 5 in a second configuration.

Referring to FIGS. 6 and 7, a water inlet 662 optionally couples an interior volume of tank 630 to a water supply line 660 (see FIG. 4) which is optionally in communication with a water source (e.g., via one or more valves, manifolds, etc). A restriction plate 664 is optionally positioned above the water inlet 662. In some embodiments, the tank 630 retains water (e.g., all water, substantially all water, 90% of water by volume, etc.) supplied via the water inlet 662 except for water exiting the tank 630 via opening 638. In some embodiments, the upper edge of the rear wall of tank 630 is higher than the opening 638.

Comparing FIG. 6 to FIG. 7, an angle A of the tank 630 (e.g., a bottom surface thereof) with respect to a horizontal plane PH is optionally adjustable between a first angle $A_1$ and a second angle $A_2$. In various embodiments, the value of $A_2$ less $A_1$ (e.g., the difference between $A_1$ and $A_2$) is 0.5 degrees, 1 degree, about 1 degree, 2 degrees, about 2 degrees, 3 degrees, about 3 degrees, between 0 and 3 degrees, between 0 and 4 degrees, between 1 and 3 degrees, between 1 and 4 degrees, between 0 and 5 degrees, between 1 and 5 degrees, etc. In some embodiments, the tank 630 is at least partially pivotally supported at one or more pivots 684 (e.g., left and right pivots) provided on one or more supports 680 (e.g., risers, frames, beams, etc. mounted to or supported on the frame 580). In some embodiments, the tank 630 is at least partially pivotally supported on one or more pivotal links 670. Each link 670 is optionally pivotally coupled at a lower pivot 672 to the frame 580. Each link is optionally pivotally coupled at an upper pivot 674 to the tank 630. The link 670 is optionally length-adjustable (e.g., telescoping) between first and second configurations such as the configurations 670A and 670B.

Figure 8:
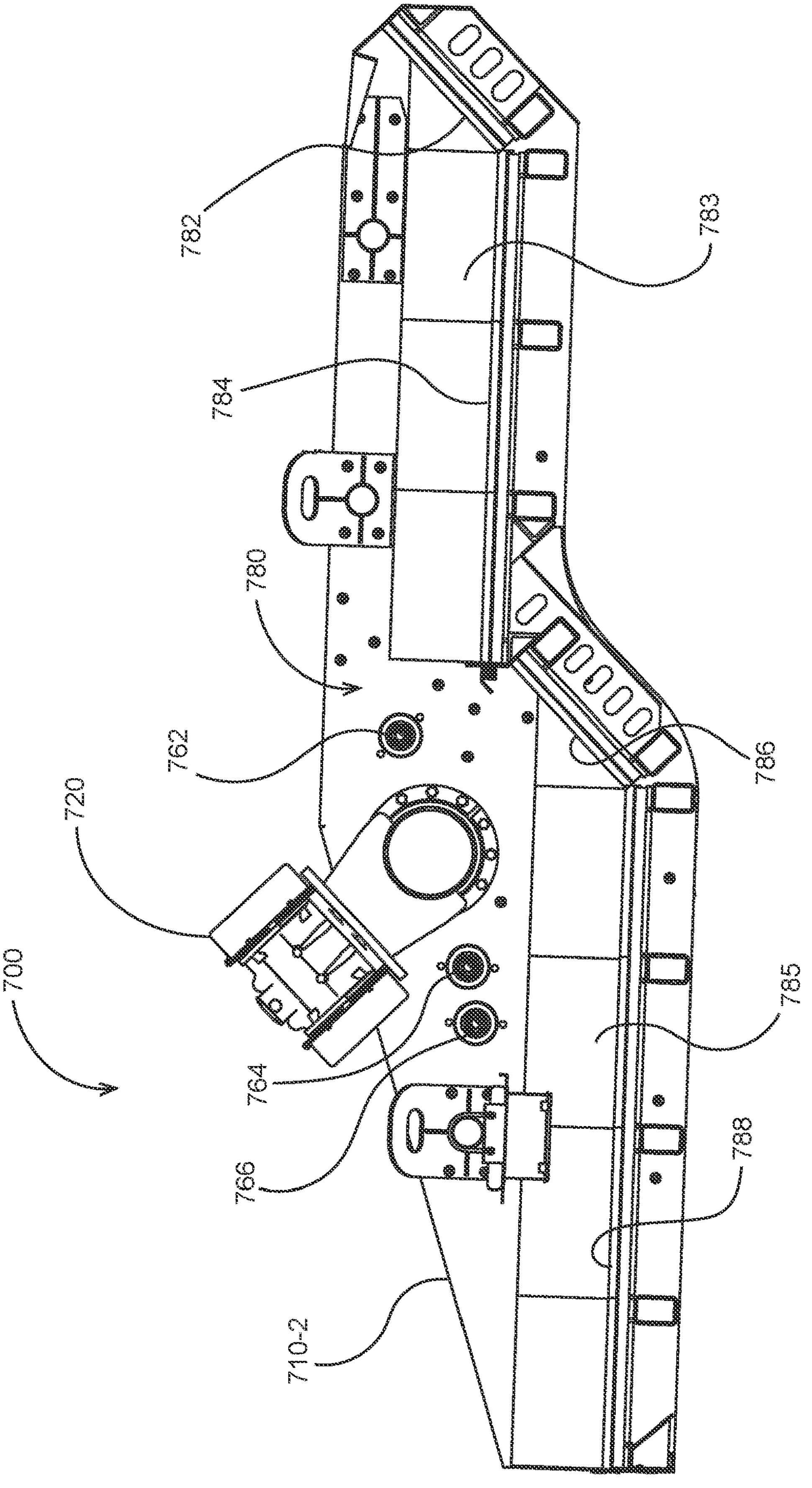
FIG. 8 is an expanded view of a portion of FIG. 6.

Referring to FIGS. 4 and 8, the dewatering mechanism 700 optionally comprises a screen arrangement 780 supported between sidewalls 710-1, 710-2. Each sidewall 710 is optionally supported on one or more sets of resilient supports 750*a*, 750*b*. The dewatering mechanism 700 optionally includes a vibratory motor 720 supported on sidewalls 710 and configured to vibrate the dewatering mechanism.

The screen arrangement 780 optionally comprises a plurality of screen media (e.g., urethane or other screen media, mesh screens, etc.). In some embodiments the screen arrangement 780 comprises a "stepped" arrangement having a first level of screen media 784 disposed at an offset (e.g., vertical offset) from a second level of screen media 788 (e.g., a second level disposed lower than the first level). In some embodiments one or more transitional screen media 786 (e.g., angularly disposed screen media) are disposed between the first and second levels of screen media. In some embodiments one or more transitional screen media 782 (e.g., angularly disposed screen media) are disposed upstream of the first level of screen media. In some embodiments a plurality of screen media 783, 785 are disposed on one or more of the sidewalls 710.

In some embodiments, an operating angle of the dewatering mechanism is adjustable. In some embodiments the operating angle of the dewatering mechanism is adjustable by adding or removing shims (e.g., under one or more resilient supports 750). In some embodiments, the operating angle of the dewatering mechanism and/or the slurrying mechanism is adjustable using an actuator (e.g., hydraulic actuator, etc.) or other mechanism.

Figure 9:
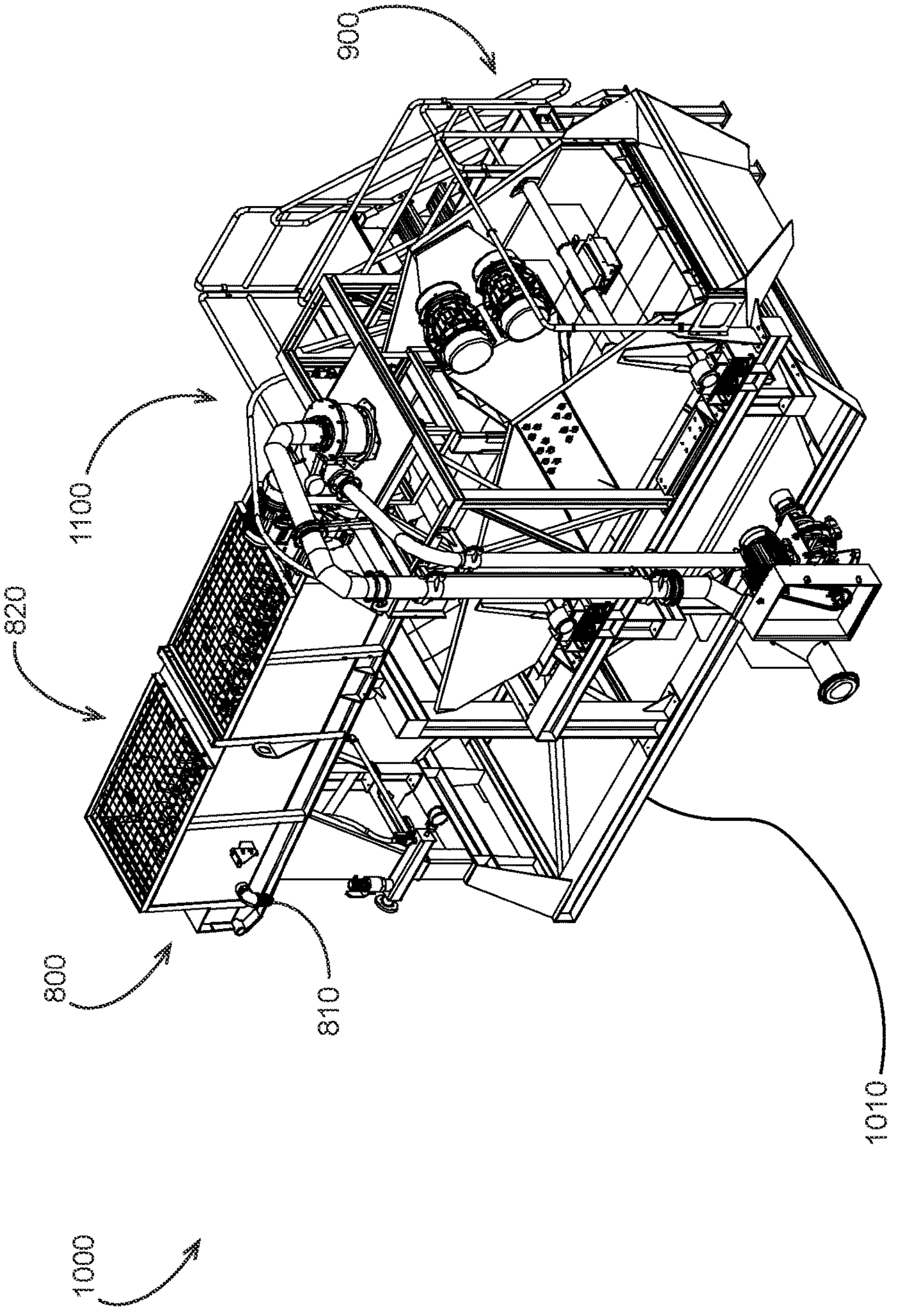
FIG. 9 is a perspective view of another embodiment of an aggregate washing system.
Figure 10:
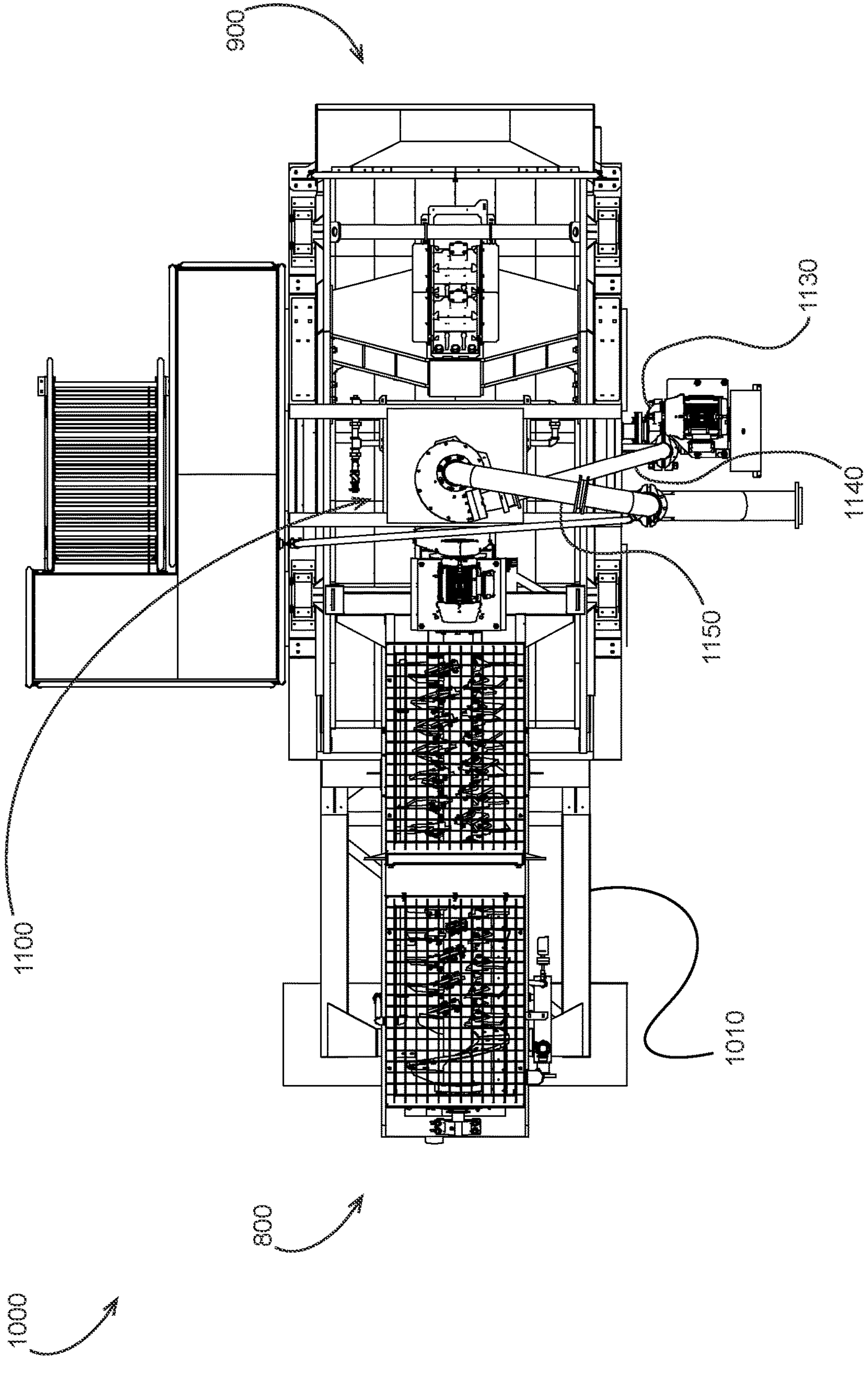
FIG. 10 is a top view of the aggregate washing system of FIG. 9.
Figure 11:
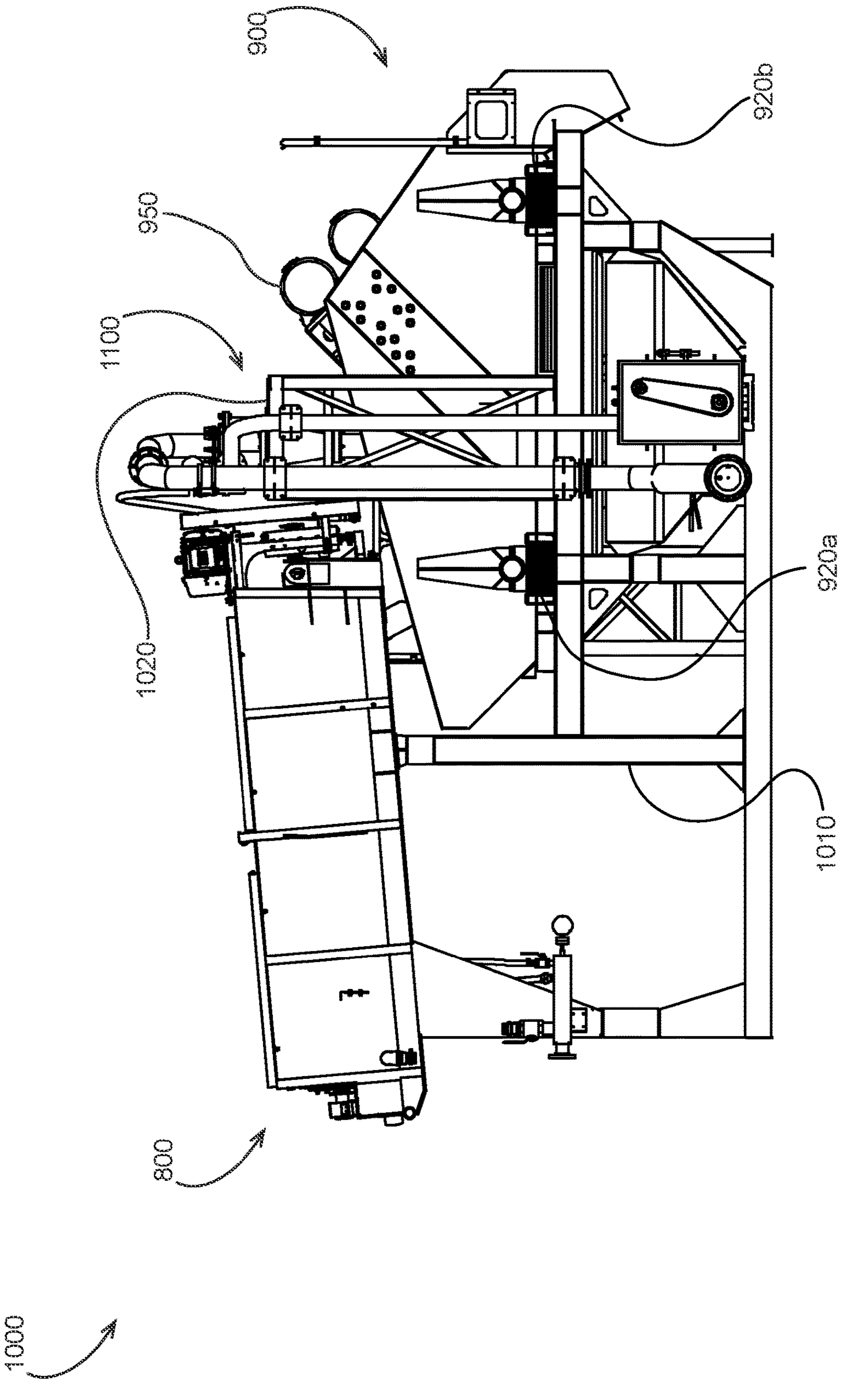
FIG. 11 is a side elevation view of the aggregate washing system of FIG. 9.
Figure 12:
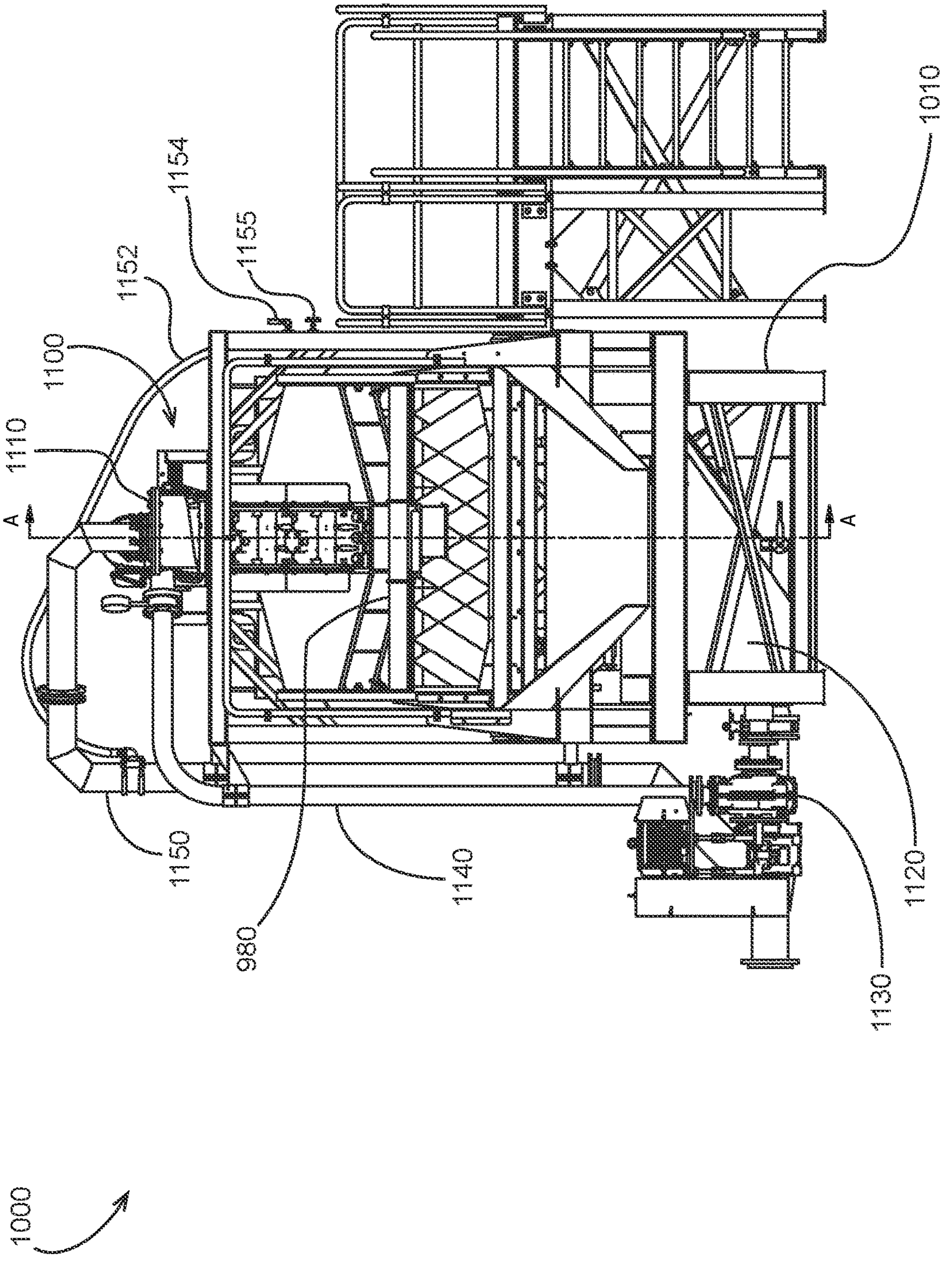
FIG. 12 is a front elevation view of the aggregate washing system of FIG. 9.

In some embodiments, the dewatering mechanism 700 is provided with one or more washing elements (e.g., spray elements such as spray bars 762, 764, 766) in fluid communication with the water supply line 660 or another water source. The spray bars are optionally supported by one or more of the sidewalls 710 and optionally include one or more outlets oriented to direct water (e.g., a spray or stream of water) toward the screen arrangement 780. In some examples, one or more washing elements (e.g., spray bar 762) is disposed and oriented to apply water (e.g., a spray or stream of water) toward a location disposed between the first and second levels of screen media. In some embodiments, the spray bar 762 is disposed to apply water to material dropping from the first level of screen media to the second level of screen media. Referring to FIG. 9, in some embodiments a spray bar or spray bars 690 are supported on the slurrying mechanism 600 and/or on the dewatering mechanism 700 and disposed to direct water onto material dropping onto and/or deposited on the screen media 782 and/or 784.

Referring to FIGS. 9-13, another embodiment of an aggregate washing system 1000 is illustrated. The system 1000 optionally comprises a slurrying mechanism 800 and a dewatering screen 900. Slurrying mechanism 800 optionally comprises a water inlet 810, a material inlet 820 (e.g., optionally including a grate), and a propulsion assembly 850 configured to propel material to an outlet 890. In some embodiments, the system 1000 includes a recirculation circuit 1100 comprising a hydrocyclone 1110. The hydrocyclone 1110 is optionally supported above the dewatering screen 900 and optionally is not supported by the dewatering screen 900, e.g., the hydrocyclone 1110 is optionally supported on a frame 1020 such that the hydrocyclone is at least partially isolated from vibration of the dewatering screen. One or more frames 1010 support the slurrying mechanism 800 and dewatering screen 900; the slurrying mechanism and dewatering screen 900 are optionally independent and/or mobile next to one another, or in some embodiments supported on a common frame 1010. The frame 1020 is optionally supported on frame 1010 or in some embodiments is supported independently from frame 1010.

In operation of the system 1000, feed material (e.g., aggregate material and water) is fed into the slurrying mechanism 800. The slurrying mechanism forms a slurry (e.g., wet aggregate slurry) which is propelled (e.g., by a screw 850) onto the dewatering screen 900. The dewatering screen is vibrated (e.g., on resilient supports 920 such as springs) by a vibratory mechanism 950. As material moves across the dewatering screen, one or more spray bars 980 or other washing elements optionally apply water to the material. Undersize material (e.g., comprising undersize aggregate material and water) optionally passes through a deck 910 into an underflume 1120. A pump 1130 optionally returns undersize material via feed conduit 1140 to the feed inlet of the hydrocyclone 1110. The underflow 1115 (which may be referred to as an underflow outlet) of the hydrocyclone 1110 optionally deposits a first subset (e.g., higher density subset) of the returned undersize material onto the deck 910. The overflow (which may be referred to as an overflow outlet) of the hydrocyclone 1110 optionally transfers a second subset (e.g., lower density subset) of the returned undersize material away from the system 1000, e.g., via conduit 1150.

In some embodiments, a valve 1155 is operable to increase, decrease or cut off supplemental air flow into the overflow conduit 1150 (e.g., via an inlet 1154 and/or conduit 1152 in fluid communication with the conduit 1150). It should be appreciated that increased supplemental airflow into the overflow conduit 1150 increases the fraction of material passing into the underflow of the hydrocyclone (e.g., back onto the dewatering screen).

Figure 14:
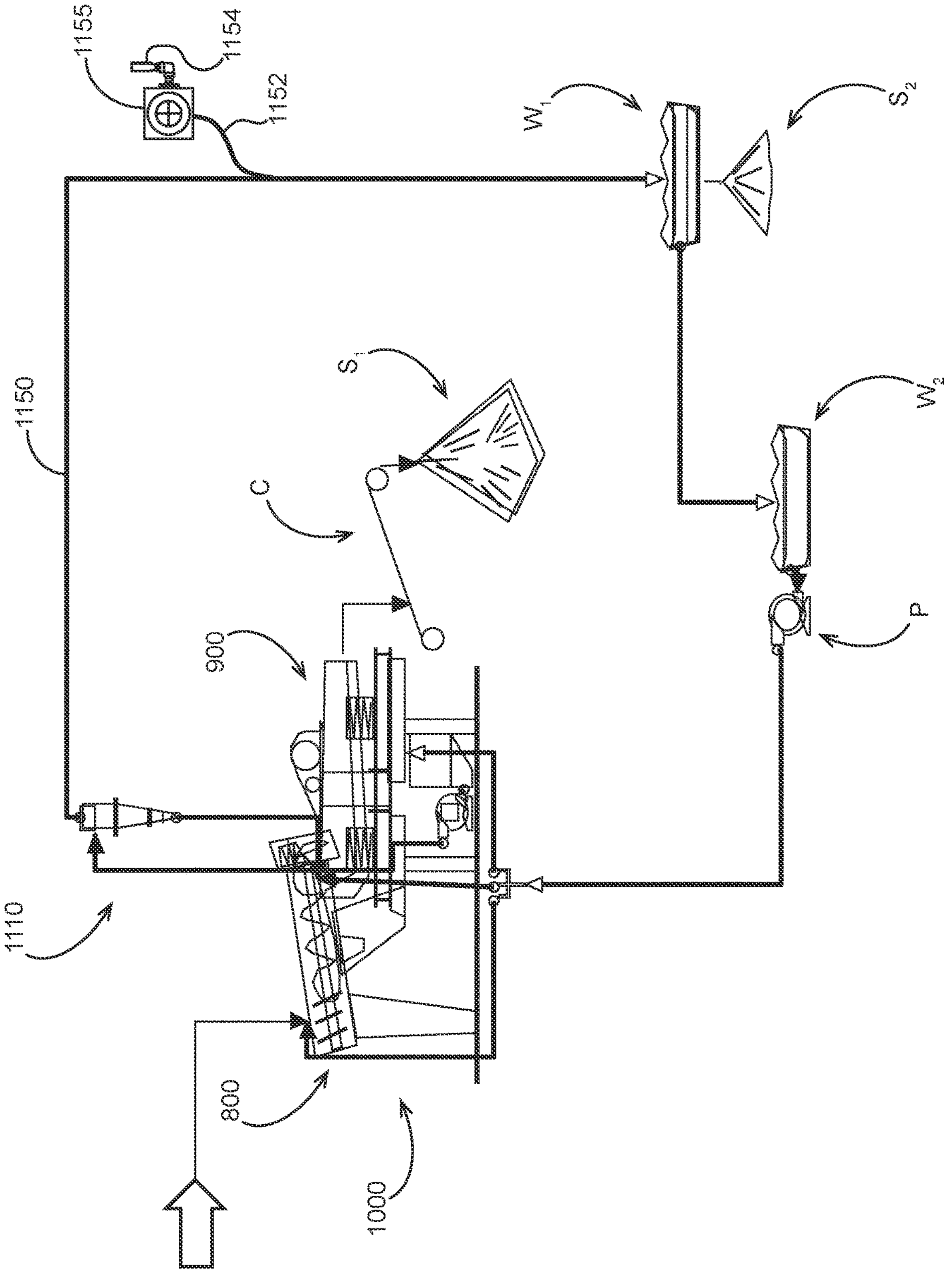
FIG. 14 schematically illustrates an embodiment of an aggregate washing system.

Referring to FIG. 14, an embodiment of system 1000 is illustrated schematically. The oversize material passing over dewatering screen 900 is optionally transferred (e.g., by a conveyor C) to a stockpile $S_1$. Fine overflow material from the hydrocyclone 1110 is optionally transferred (e.g., via conduit 1150 and/or one or more conveyance devices) to a settling pond $W_1$ at which settlement stockpile $S_2$ is formed. Fine material from settling pond $W_1$ is optionally transferred to settling pond $W_2$. Water and aggregate material from settling pond $W_2$ is optionally pumped via pump P to one or more locations in system 100 (e.g., the inlet end of slurrying mechanism 800, the outlet end of slurrying mechanism 800, and/or the dewatering screen 900.

Figure 15:
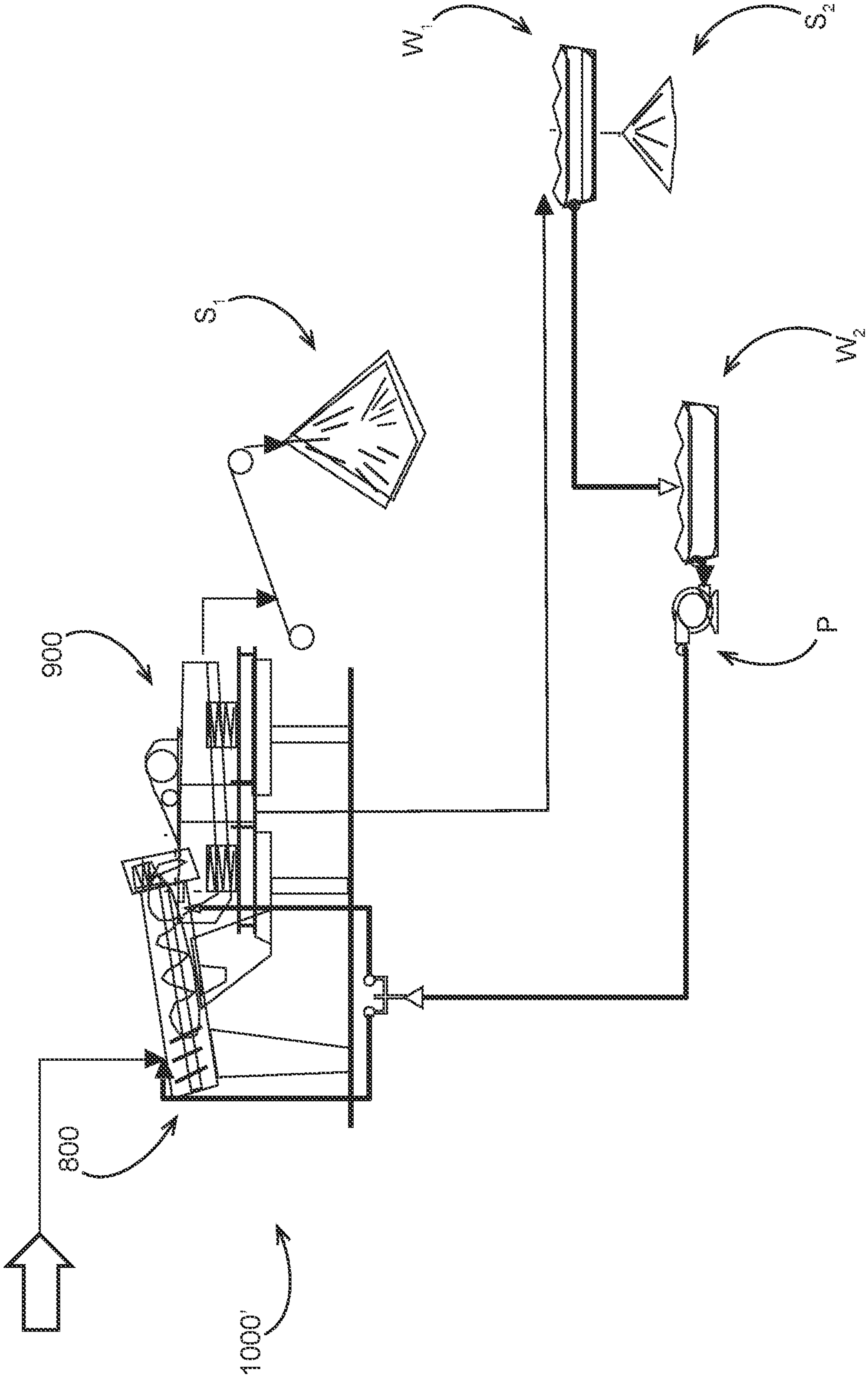
FIG. 15 schematically illustrates another embodiment of an aggregate washing system.

Referring to FIG. 15, an alternative embodiment of a system 1000' is illustrated. The system 1000' optionally does not have a recirculating circuit. In the system 1000', undersize material passing through dewatering screen 900 is optionally transferred directly to settling pond $W_1$.

Figure 13:
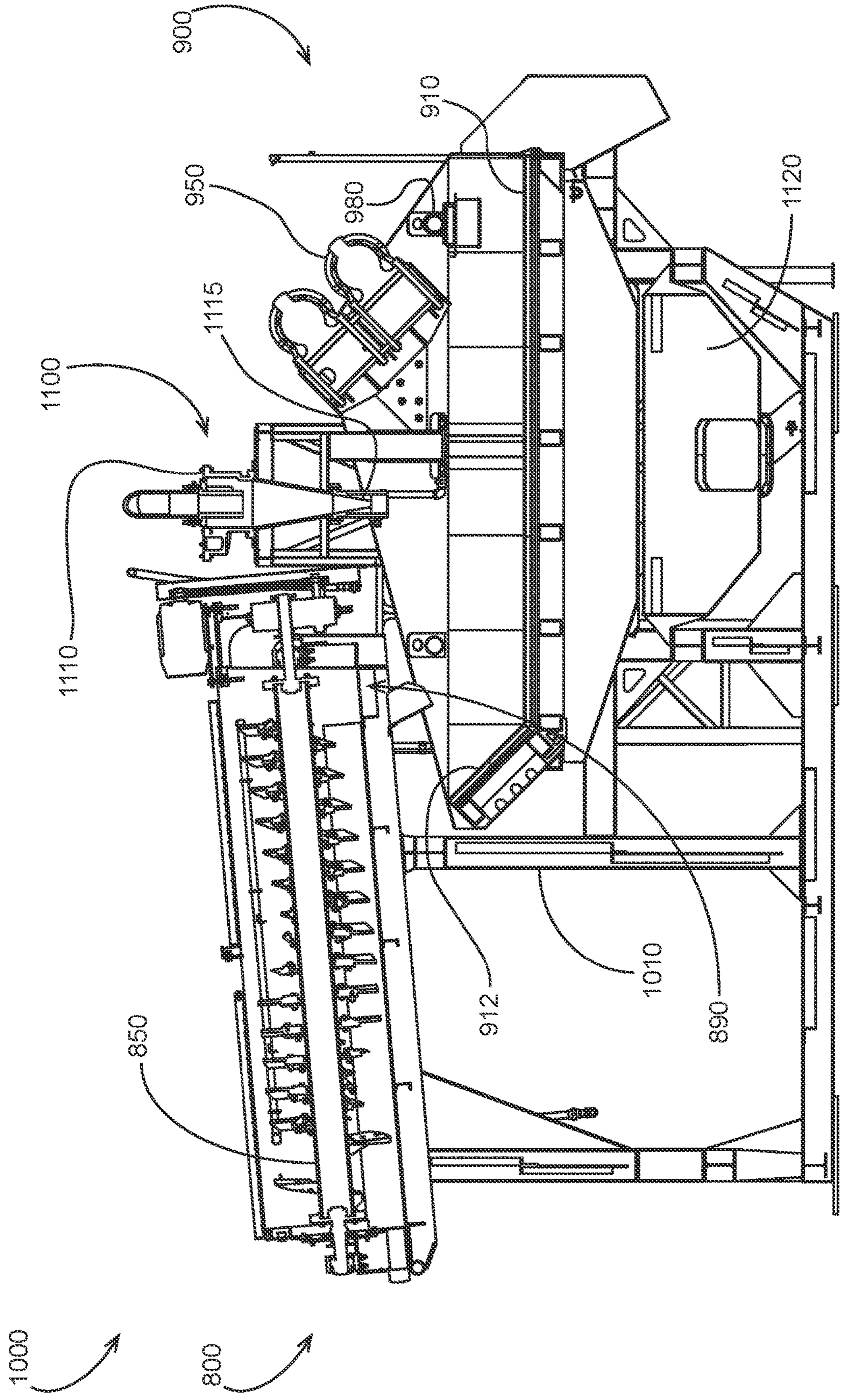
FIG. 13 is a sectional view of the aggregate washing system of FIG. 9 along section A-A of FIG. 12.

Referring to FIG. 13, in some embodiments the dewatering screen 900 includes an angled deck portion 912 upstream of the deck 910. In some embodiments, the deck 910 is approximately 6 feet long, greater than 5 feet wide, between 5 and 7 feet wide, between 5.5 and 6.5 feet wide, etc. In some embodiments, the deck 910 comprises a plurality of vertical elements that extend into the flow of material above the deck 910. In some embodiments, the aperture size of apertures in deck 910 is greater than 0.3 mm, greater than 0.4 mm, about 0.5 mm, between 0.4 and 0.5 mm, etc. In some embodiments, the dewatering screen 900 is vibrated at a stroke amplitude of about 3⁄16 inch, greater than 2⁄16 inch, between 2⁄16 inch and 1⁄4 inch, etc. In some embodiments, the dewatering screen 900 is operated at a frequency of about 1200 rpm, between 1100 and 1300 rpm, less than 1300 rpm, etc. In some embodiments, the dewatering screen 900 is vibrated to a g force of between 2 g and 3 g, greater than 2 g, greater than 1.5 g, etc.

The aggregate washing system embodiments described herein may be incorporated in mobile or stationary plants either alone or in combination with other equipment such as one or more conveyors (e.g., belt conveyors), one or more crushers (e.g., cone crushers, jaw crushers, gyratory crushers, impact crushers, etc.), and/or one or more classifiers (e.g., vibratory screens, grizzly feeders, hydraulic classifiers, hydrocyclones, etc.).

Ranges recited herein are intended to inclusively recite all values and sub-ranges within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A method of washing aggregate material, the method comprising:

receiving aggregate material in a tank;

receiving water in said tank;

by at least a rear wall of said tank, retaining said aggregate material and said water in a rearward portion of said tank and preventing said water and said aggregate material from overflowing said rear wall;

agitating said aggregate material and said water to form a slurry;

advancing said slurry to a tank outlet in a forward portion of said tank;

depositing said slurry through said tank outlet;

receiving said slurry on a vibrating screen;

vibrating said vibrating screen;

moving said slurry across at least a portion of said vibrating screen;

allowing an undersize portion of said slurry to fall through said vibrating screen;

pumping at least a fraction of said undersize portion to a hydrocyclone;

by said hydrocyclone, separating said fraction of said undersize portion into an underflow fraction and an overflow fraction;

receiving said underflow fraction on said vibrating screen; and passing product from said vibrating screen.

2. The method of claim 1, wherein said product comprises at least a portion of said underflow fraction.

3. The method of claim 2, wherein said product comprises a saleable sand.

4. The method of claim 1, wherein said tank retains all water received in said tank except for water exiting the tank via said tank outlet.

5. The method of claim 1, wherein said tank retains substantially all water received in said tank except for water exiting the tank via said tank outlet.

6. The method of claim 1, further comprising:

by a washing element, applying water to said slurry as said slurry moves across said vibrating screen.

7. The method of claim 6, further comprising:

by said washing element, applying water to said underflow fraction.

8. The method of claim 1, further comprising:

by adjusting a valve, modifying a magnitude of said underflow fraction relative to a magnitude of said overflow fraction.

9. The method of claim 8, further comprising:

transferring said overflow fraction away from said hydrocyclone via an overflow conduit; and allowing supplemental air flow into said overflow conduit.

10. The method of claim 9, further comprising:

by adjusting said valve, modifying said supplemental air flow.

11. The method of claim 9, further comprising:

by adjusting said valve, increasing said supplemental air flow, thereby increasing said magnitude of said underflow fraction relative to said magnitude of said overflow fraction.

12. The method of claim 1, further comprising:

increasing a magnitude of said underflow fraction relative to a magnitude of said overflow fraction.

13. The method of claim 1, further comprising:

supporting said hydrocyclone above said vibrating screen and separately from said vibrating screen such that vibration of said vibrating screen does not vibrate said hydrocyclone.

* * * * *